United States Patent [19]
Yagi et al.

[11] 3,910,158
[45] Oct. 7, 1975

[54] METHOD OF AND APPARATUS FOR CUTTING CIRCULAR VARIABLE PITCH GEAR
[75] Inventors: Kenji Yagi; Susumu Kidokoro, both of Fuji, Japan
[73] Assignee: Nissan Motor Company Limited, Yokohama, Japan
[22] Filed: Apr. 11, 1974
[21] Appl. No.: 460,162

[30] Foreign Application Priority Data
Apr. 14, 1973  Japan.............................. 48-41827

[52] U.S. Cl............................................. 90/2; 90/4
[51] Int. Cl.² ........................................ B23F 3/00
[58] Field of Search .............................. 90/2, 3, 4, 7

[56] References Cited
UNITED STATES PATENTS
1,922,756   8/1933   Candee................................ 90/4 X
FOREIGN PATENTS OR APPLICATIONS
154,762   7/1963   U.S.S.R.................................. 90/2

Primary Examiner—Leonidas Vlachos

[57] ABSTRACT
A gear-blank moving at a variable angular velocity is cut by a cutter moving at a constant speed in an apparatus providing very accurate and inexpensive cutting of such a gear.

1 Claim, 3 Drawing Figures

METHOD OF AND APPARATUS FOR CUTTING CIRCULAR VARIABLE PITCH GEAR

This invention relates to a method and apparatus for cutting a circular variable pitch gear which enables two meshing gears to rotate at a varying speed ratio.

As a method of obtaining a variable speed ratio between two meshing gears, there is heretofore known a method of engaging two non-circular gears or engaging two gears having plural portions of different pitch. However, in the case of these methods, it is extremely difficult to cut the teeth of such gears and to fabricate a cutter for cutting such teeth and, in addition, it is almost impossible technically and economically, to accurately cut such gear teeth.

On the other hand, there is a demand for a variable steering gear ratio for a steering device of an automobile to make the manual steering effort uniform. In other fields, there are also many cases in which variable speed ratios of meshing gears are desirable.

It is, therefore, an object of the present invention to provide a method of cutting a circular variable pitch gear which enables two meshing gears to rotate at varying angular speed ratios to provide a very accurate and inexpensive variable pitch gear.

It is another object of the present invention to provide an apparatus for cutting a circular variable pitch gear which enables two meshing gears to run at varying speed ratios and which is simple in construction and operates accurately for performing the method of this invention.

Based upon the fact that gears made by the same cutter can engage at all times smoothly with each other, the present invention provides a method and apparatus for cutting a circular variable pitch gear by cutting a gear blank moving at a variable angular velocity by a cutter moving at a constant speed.

These and other objects, features and advantages of the method and apparatus for cutting a circular variable pitch gear according to the present invention will become fully apparent from the following description taken in conjunction with the accompanying drawings, in which.

Figure 1:
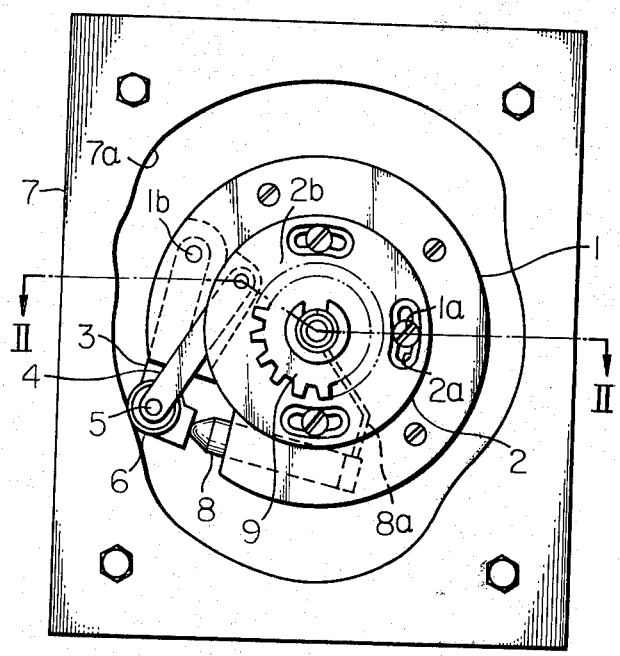
FIG. 1 is a plan view of a device for driving a gear blank at a variable angular velocity according to the present invention.
Figure 2:
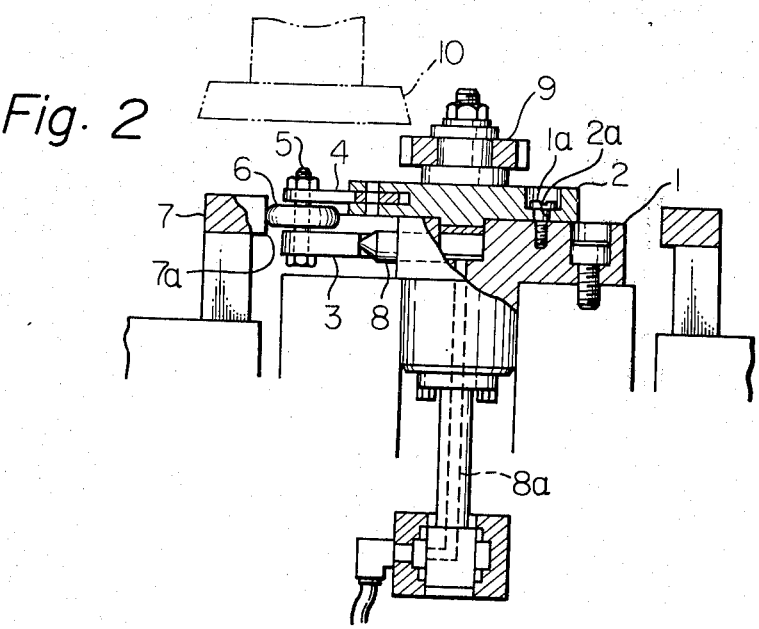
FIG. 2 is a sectional view of the FIG. 1 device taken along the line II—II in FIG. 1.
Figure 3:
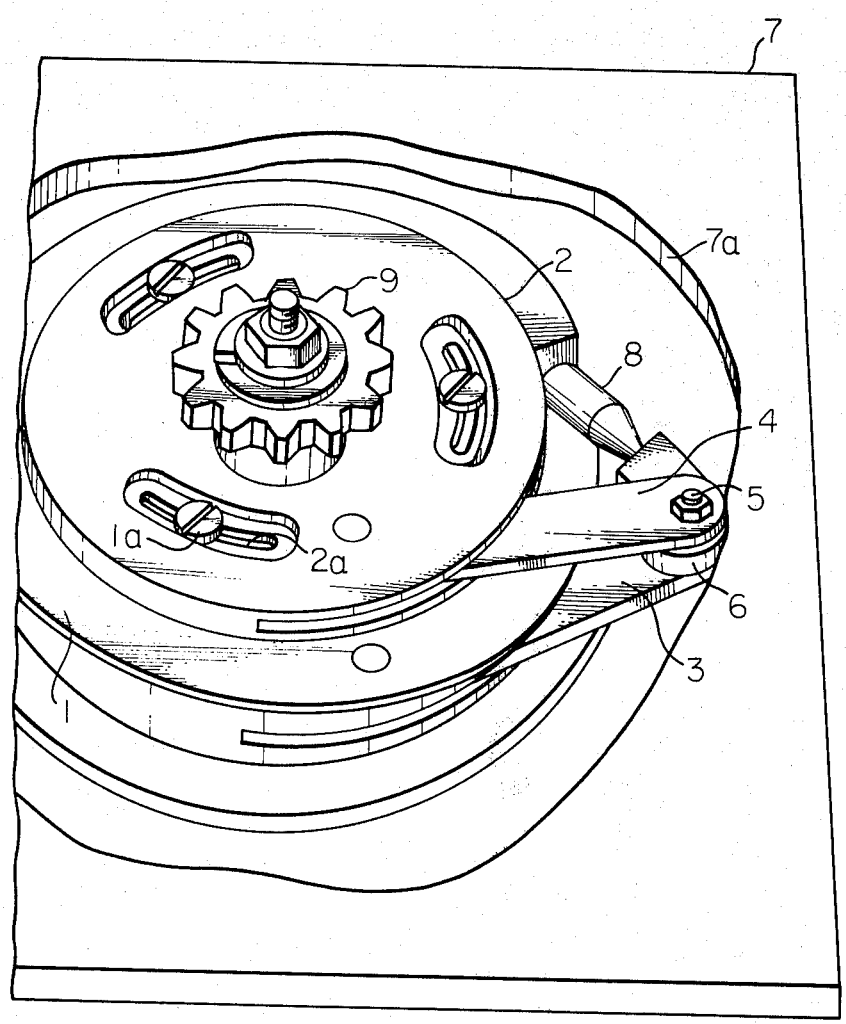
FIG. 3 is a perspective view of the FIG. 1 device.

Referring now to FIGS. 1 to 3, which show one embodiment of a device of the present invention, numeral 1 indicates a first table rotating at a constant velocity, 2 a second table resting on the first table 1 and allowed to be rotated relative to the first table 1 within a predetermined range limited by elongate holes 2a formed therein and pins 1a mounted on the first table 1 and inserted in the holes. A first link 3 is supported at one end by a pin 1b mounted on the first table 1 in the vicinity of the periphery thereof. A second link 4 is supported at one end by a pin 2b mounted on the second table 2 in the vicinity of the periphery thereof. A movable shaft 5 pivotally secures the other ends of the first and second links 3 and 4. A roller 6 is rotatably mounted on the movable shaft 5. An internal guide cam 7 has a non-circular inner cam profile 7a. A piston 8 is provided for urging the other end of the first link 3 to cause the link 3 to move clockwide and for urging by hydraulic pressure the roller 6 at all times to follow the cam surface 7a of the guide cam 7. The piston 8 communicates with a source of fluid under pressure (not shown) through a duct 8a.

In the operation of the device thus constructed, when the first table 1 rotates at a constant speed, the roller 6 moves radially back and forth with respect to the axes of the first and second tables 1 and 2 while contacting at all times the cam surface 7a. More particularly, when the roller 6 moves toward the rotary center, the pin 2b and with it the table 2 are urged through the first and second links 3 and 4 in the same direction as the rotating direction thereof, and when the roller 6 is moved away from the rotary center, the pin 2b and the table 2 are moved opposite to the rotating direction. Accordingly, the second table 2 rotates relative to the first table 1 with the result that the table 2 rotates at a variable angular velocity.

Thus, when a gear blank 9 is secured in alignment with the second table 2 and is cut by a cutter 10 shown in FIG. 2 such as a pinion cutter rotating and vertically moving at a constant speed, a circular variable pitch gear will be obtained. When a gear thus formed is made to engage and mesh with a normal gear which was cut using the same cutter by the constant speed cutting process, a uniform angular velocity motion of the shaft of one gear will result in a variable angular velocity motion of the other gear and shaft.

The aforesaid device for driving the gear at a variable angular velocity may be used by mounting it on a gear shaper, etc. generally used. Thus, it may cut a circular or circular-but-partly-non-circular variable pitch gear and may also cut a bevel gear by using a helical guide, and may also cut a conical variable pitch gear by placing the cutter bead obliquely.

It should be understood from the foregoing description that since a variable pitch gear can be cut without using any special devices and cutters according to the method of the present invention, the variable pitch gear can be very accurately and inexpensively provided, and that the device for driving a gear blank at a variable angular velocity is simple in construction and operates accurately, and a desired variable speed ratio can be easily obtained by selecting properly the cam profile of the guide cam and the device can be mounted on the work tables of a gear shaper, hobbing machine, thunderland gear cutter, etc. generally used.

What is claimed is:

1. In apparatus for cutting a circular gear from a gear blank, the apparatus having a cutter which is rotatable about a first axis at a constant speed and movable axially to engagement with the gear blank, a device for supporting and rotating said gear blank at a variable angular velocity thereby to cut a circular variable gear, the device comprising: a first table rotatable about a second axis vertical thereto at a constant speed; a second table resting coaxially on said first table such that said second table is rotatable relatively to said first table; means to hold said gear blank coaxially on said second table; a stationary cam member having a non-circular inner cam profile, said cam profile surrounding and being spaced laterally from said first and second tables; a first link supported at one end thereof on said first table; a second link supported at one end thereof on said second table; said first and second links being joined pivotally with each other at the other ends thereof by a movable shaft; a roller mounted rotatably on said shaft; a fluid pressure-operated piston disposed between said first table and said first link so that said roller is always urged to follow said cam profile by said piston during rotational movements of said first and second tables; and means to rotate said first table at a constant speed.

* * * * *